US 6,599,102 B2

(12) United States Patent
Nonaka et al.

(10) Patent No.: US 6,599,102 B2
(45) Date of Patent: Jul. 29, 2003

(54) GAS COMPRESSOR AND AIR CONDITIONING SYSTEM (75) Inventors: Takeshi Nonaka, Chiba (JP); Chihiro Hirama, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/873,609

(22) Filed: Jun. 4, 2001

(65) Prior Publication Data
US 2002/0001533 A1 Jan. 3, 2002

(30) Foreign Application Priority Data
Jun. 5, 2000 (JP) ........................................ 2000-166984
Dec. 27, 2000 (JP) ........................................ 2000-397034

(51) Int. Cl.[7] ............................. F04B 17/00; F04B 35/00
(52) U.S. Cl. .................... 417/316; 192/82 T; 192/84.961
(58) Field of Search ......................... 192/82 T, 84.961, 192/84 R, 150, 129 A, 138; 417/316; 418/69

(56) References Cited

U.S. PATENT DOCUMENTS

| 4,072,220 A | | 2/1978 | Hamada | 192/0.075 |
|---|---|---|---|---|
| 4,403,683 A | | 9/1983 | Takano | 192/0.052 |
| 4,425,992 A | * | 1/1984 | Makita | 192/82 T |
| 4,799,578 A | * | 1/1989 | Matsushita | 192/84 C |
| 5,094,332 A | | 3/1992 | Wall | 192/82 T |
| 5,146,763 A | * | 9/1992 | Cummings et al. | 62/228.1 |
| 5,404,980 A | * | 4/1995 | Shafer | 192/84 C |
| 5,497,870 A | * | 3/1996 | Takashi | 192/84 C |
| 5,687,823 A | * | 11/1997 | Nakagawa et al. | 192/84.961 |
| 5,941,357 A | | 8/1999 | Tabuchi et al. | 192/84.961 |
| 5,984,069 A | * | 11/1999 | Takahashi | 192/84.961 |
| 6,161,671 A | * | 12/2000 | Sakamoto et al. | 192/82 T |

* cited by examiner

Primary Examiner—Charles G. Freay
Assistant Examiner—Han L Liu
(74) Attorney, Agent, or Firm—Adams & Wilks (57) ABSTRACT Disclosed are a gas compressor and an air conditioning system in which an anomalous temperature rise in an electro-magnetic clutch is detected at an early stage to stop the operation of the gas compressor. A temperature sensor is mounted at a position in the vicinity of a portion of the electro-magnetic clutch which is subject to anomalous heat generation. When there is a rise in the temperature as detected by the temperature sensor, a driving circuit of the electro-magnetic clutch is interrupted before trouble is caused by an abnormally high temperature.

23 Claims, 7 Drawing Sheets

GAS COMPRESSOR AND AIR CONDITIONING SYSTEM

BACKGROUND OF THE INVENTION

1. Field of the Invention

This invention relates to a gas compressor which receives compressive power from outside through an electro-magnetic clutch and to an air conditioning system having this gas compressor.

2. Description of the Related Art

Many of the vane-rotary-type gas compressors, scroll-type gas compressors, swash-plate-type gas compressors, etc. used in automotive air conditioners, GHP or the like, receive drive power from outside through an electro-magnetic clutch. An example in which an electro-magnetic clutch is used in a vane-rotary-type gas compressor will be described with reference to FIGS. 1 and 2. An electro-magnetic clutch 10 is mounted to a case cover 23 provided in the outer periphery of one end portion of a rotor shaft 22 retaining a rotor 21 equipped with vanes 20. More specifically, stationary portions of the electro-magnetic clutch 10 which do not rotate, that is, an annular core 11 and a coil 12 provided inside the core 11, are mounted to an intermediate shoulder end surface 23a of the case cover 23 by means of a retaining ring 13a through the intermediation of a core flange portion 13 of the core 11. The core flange portion 13 has a protrusion 13b, which is fitted into a recess 23b of the intermediate shoulder end surface 23a of the above-mentioned case cover to thereby prevent rotation of the core 11.

Figure 1:
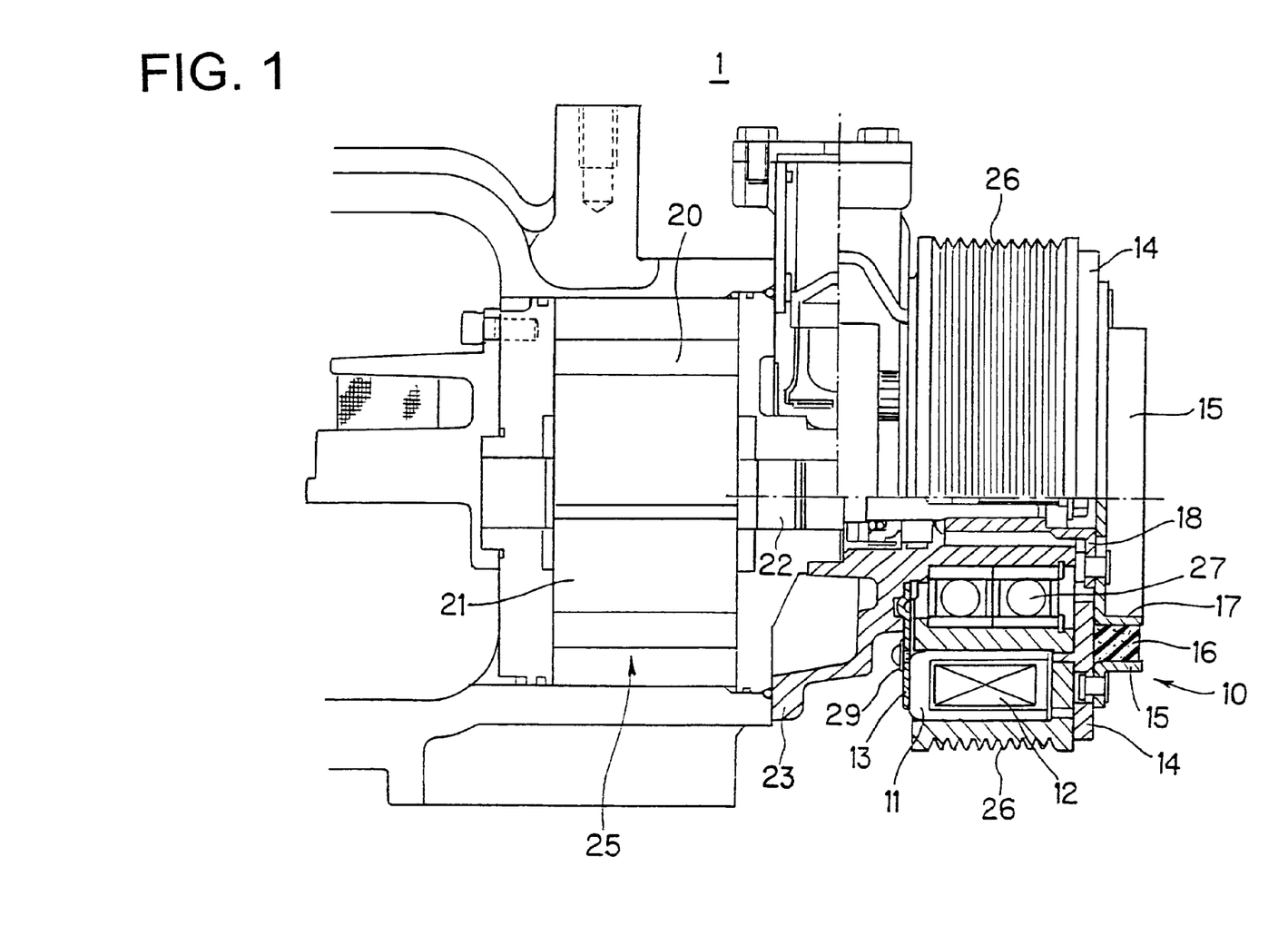
FIG. 1 is a longitudinal sectional view of an embodiment of the present invention.
Figure 2:
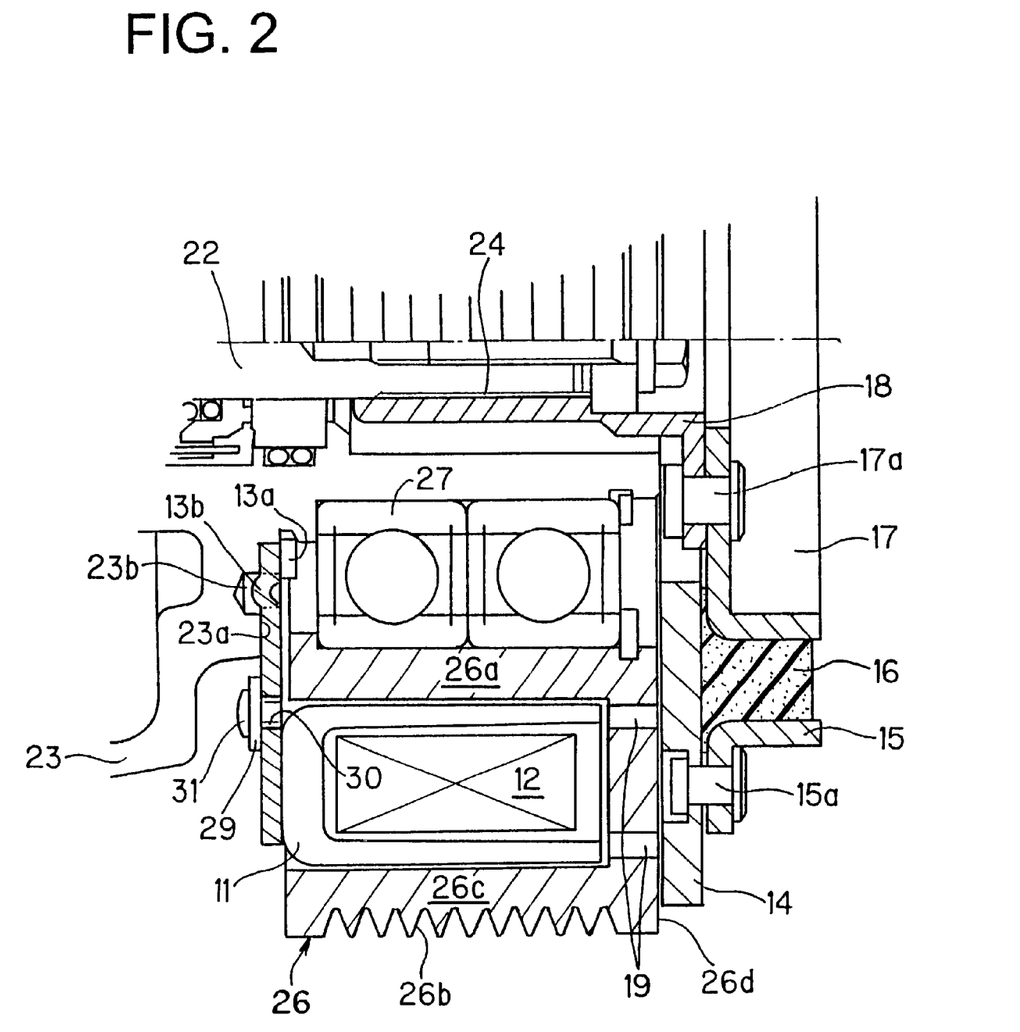
FIG. 2 is an enlarged partial view of FIG. 1.

Further, in the rotatable driven portion of the electro-magnetic clutch, an armature friction plate 14, a buckling 15, an elastic coupling body 16, a base plate 17, and a hub 18 are connected together. The hub 18 is further connected to the rotor shaft 22.

The manner in which the above-mentioned components are connected will be described more specifically. The armature friction plate 14 and the buckling 15 are connected to each other by means of a plurality of joint pins 15a. The buckling 15 and the base plate 17 are integrally connected to each other by the elastic coupling body 16, which is formed of torsional rubber. When the armature friction plate 14 is attracted by the magnetic force of the clutch, the elastic coupling body 16 undergoes elastic deformation. The base plate 17 and the hub 18 are connected to each other by means of a plurality of joint pins 17a. The hub 18 is fastened to one end of the rotor shaft 22 by means of a spline 24 so as to be connected to a compressor main body 25 side.

The rotatable driving portion of the electro-magnetic clutch comprises a pulley 26 formed of a magnetic material, and this pulley 26 is mounted to the case cover 23 through the intermediation of a ball bearing 27.

In the pulley 26, an inner peripheral portion 26a forming a bearing housing and an outer peripheral portion 26c having pulley grooves 26b in the outer periphery thereof are connected to each other on a pulley end surface 26d side so as to define a U-shaped sectional configuration, and the core 11 is accommodated in the recess thus defined. Numeral 19 indicates holes for forming a magnetic circuit between the armature friction plate 14 and the pulley 26.

When the above-described gas compressor is used in an automotive air conditioner, the pulley 26 on the driving side is rotated by a belt (not shown) entrained about it and about the output shaft of the engine. When the electro-magnetic clutch 10 is not energized, the armature friction plate 14 on the driven side is spaced apart from the pulley 26, and does not rotate. In this state, the gas compressor is at rest.

When electric current is supplied to the coil 12 of the electro-magnetic clutch 10 to energize the same, the armature friction plate 14 is attracted by the end surface 26d of the pulley 26 due to the magnetic flux of the coil, whereby the driving side and the driven side of the electro-magnetic clutch 10 are integrated with each other, causing the rotor shaft 22 to rotate. In this state, the gas compressor is operating, with the elastic coupling body 16 undergoing elastic deformation.

In the conventional gas compressor, burning of the electro-magnetic clutch or rupture of the belt can happen during operation, though on rare occasions. On examination, it has been found that such trouble is attributable to the following phenomena.

(1) Anomalous Heat Generation of the Ball Bearing 27

Figure 7:
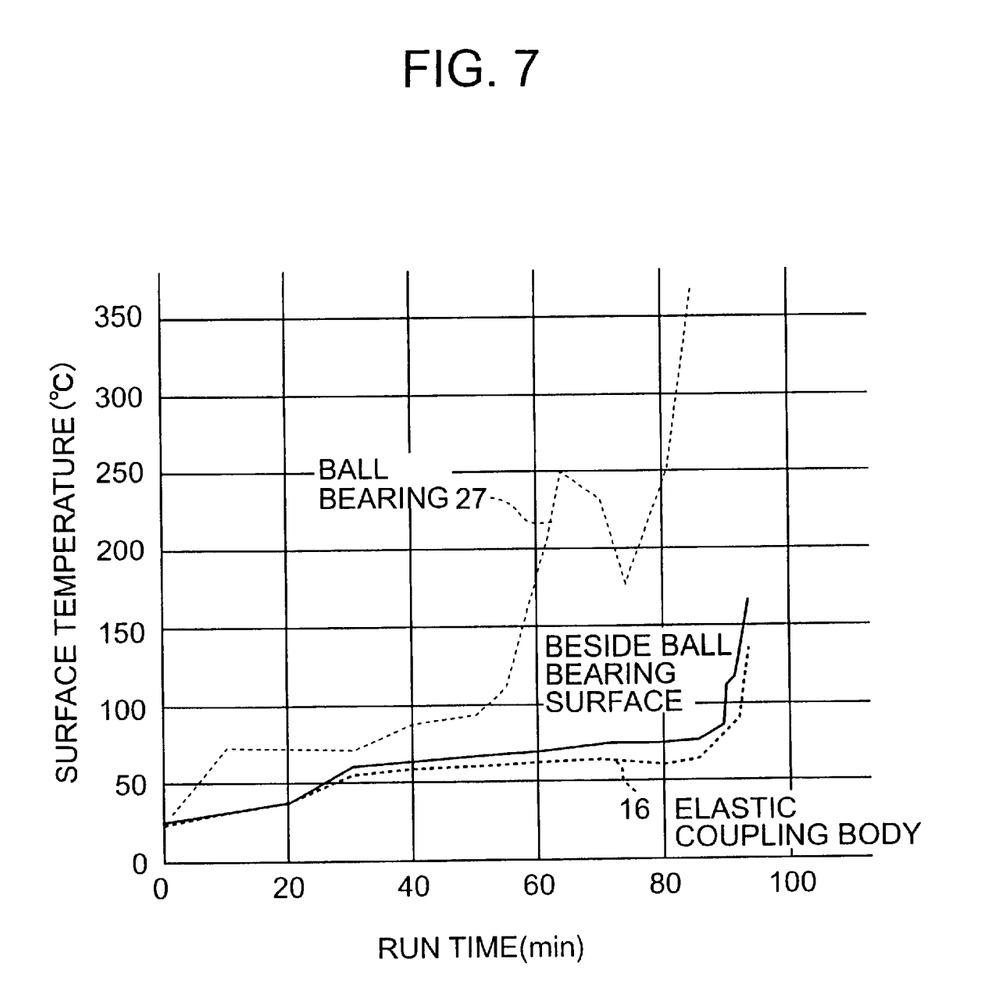
FIG. 7 is an explanatory diagram showing how the temperature rises when ball bearing failure occurs in the embodiment of FIG. 1.
Figure 8:
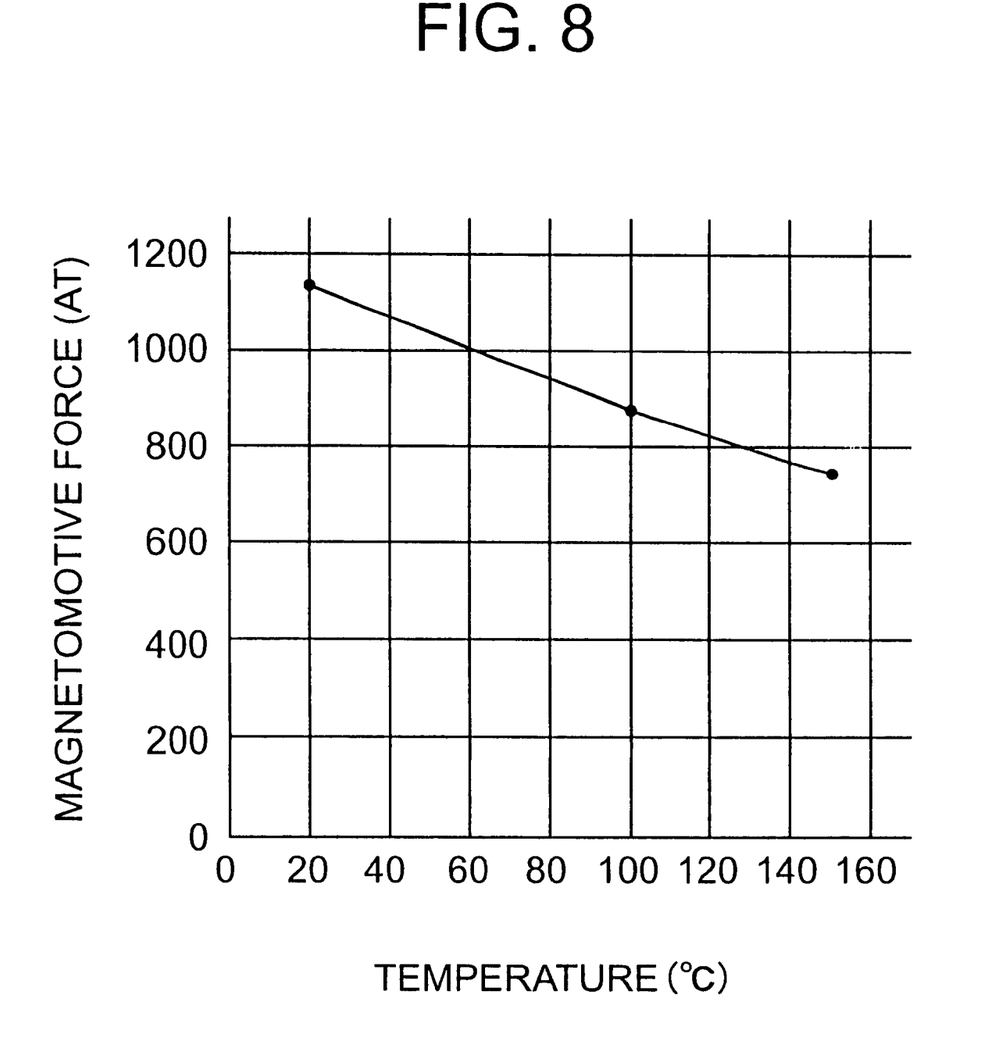
FIG. 8 is an explanatory diagram showing the relationship between temperature and magnetomotive force in an electromagnetic clutch.

When the ball bearing 27 generates more heat than usual due to poor lubrication, wear, etc. and attains a high temperature as shown in FIG. 7, the heat is transmitted to the core 11 of the electro-magnetic clutch 10, which is beside the ball bearing surface and which surrounds the outer periphery of the bearing, and the core 11 also attains a high temperature, with the result that the mold thereof is melted, which may cause short-circuiting of the wiring. Further, the coil 12 and the portion of the pulley 26 near the end friction surface 26d also attain a high temperature, resulting in a reduction in the magnetomotive force of the electro-magnetic clutch 10, as shown in FIG. 8.

The reduction in the magnetomotive force weakens the attracting force acting between the pulley 26 and the armature friction plate 14, and slippage occurs therebetween, thereby generating sparks. Further, the frictional heat generated causes an increase in the ambient temperature, thereby destroying the elastic coupling body 16 made of rubber. In this state, the armature friction plate 14 comes into contact with the hub 18, and frictional heat is generated to thereby generate sparks, with the result that the core 11 undergoes further temperature rise. Further, the rotor shaft 22 ceases to rotate in the normal manner.

When the temperature of the core 11 exceeds 200° C., the mold is softened and melted. If such an acute temperature rise can be detected before this temperature level is reached, this trouble could be prevented.

(2) Anomalous Heat Generation of the Electro-magnetic Clutch

When rotation is continued after the breakage of the ball bearing 27, the core 11 and the pulley 26, which are spaced apart from each other by a small gap, come into contact with each other, and the resultant frictional heat causes a rapid temperature rise in the core 11. In this case also, the mold is melted, the wiring is short-circuited, or the magnetomotive force is reduced. The trouble caused in this case is the same as that in the above-described phenomenon (1).

When the ball bearing 27 is eventually locked as a result of breakage, slippage occurs between the pulley 26 and the belt, and the resultant frictional heat will damage and rupture the belt.

Even when the ball bearing 27 is in the normal condition, heat generation in the core 11 can happen as a result of short-circuiting of the wiring.

(3) Clutch Slippage

Further, during the operation of the electro--magnetic clutch, clutch slippage, i.e., slippage between the pulley end surface 26d and the armature friction plate 14, occurs. As is well known, this slippage mitigates the shock at the time of start-up, allowing the system to start smoothly. Repetition of start-up operation leads to gradual wear of the contact surface of the armature friction plate 14. Further, even when the gas compressor is performing normal operation, minute slippage occurs as a result of fluctuations in load in rotor rotation, momentary overload, etc.

Clutch slippage naturally involves heat generation. An abnormal increase in the slippage between the pulley end surface 26d and the armature friction plate 14 as a result of wear of the armature friction plate 14, etc. causes an increase in slippage and heat generation, which can damage the contact surfaces and fuse them together. Damage to the contact surfaces will cause a further increase in clutch slippage or make them incapable of coming into contact with each other, which means the engagement of the clutch cannot be effected. Fusion of the contact surfaces makes it impossible to effect disengagement of the clutch.

It is to be noted, however, that anomalous clutch slippage is accompanied by radiation of heat and generation of sparks due to anomalous heat generation, which means the above trouble could be prevented if these phenomena can be detected.

SUMMARY OF THE INVENTION

This invention has been made in order to solve the above problem in the prior art. It is accordingly an object of this invention to provide a gas compressor and an air conditioning system in which it is possible to detect an abnormal temperature rise in the electro-magnetic clutch at an early stage to stop the energization thereof or stop the operation of the air conditioning system as a whole.

To achieve the above object, there is provided, in accordance with this invention, a gas compressor of the type in which external power is transmitted to the compressor main body through an electro-magnetic clutch, wherein a temperature sensor is mounted to the outer surface of the electro-magnetic clutch or to a portion near the outer surface thereof.

Since it is most desirable to detect the temperature of the armature friction plate, which generates heat as a result of slippage, and the temperature of the core or the ball bearing, which generates heat due to the load at the time of power transmission, the temperature sensor is preferably arranged in the vicinity of the armature friction plate or mounted to the core flange portion for mounting the electro-magnetic clutch or to a portion in the vicinity of the core or the ball bearing of the electro-magnetic clutch so as to be externally detachable.

In accordance with the present invention, there is further provided an air conditioning system of the type which includes a gas compressor in which external drive power is transmitted to the compressor main body through an electro-magnetic clutch, the air conditioning system comprising a temperature sensor mounted to the electro-magnetic clutch or to a portion in the vicinity thereof, an outlying temperature decision means for making a judgment as to whether the detection output of the temperature sensor is an anomalous value, and an emergency stop means which interrupts a driving circuit of the electro-magnetic clutch or stops the air conditioning system upon receiving an anomaly decision output from the outlying temperature decision means.

DETAILED DESCRIPTION OF THE PREFERRED EMBODIMENT

Embodiments of this invention will now be described with reference to the drawings.

Figure 3:
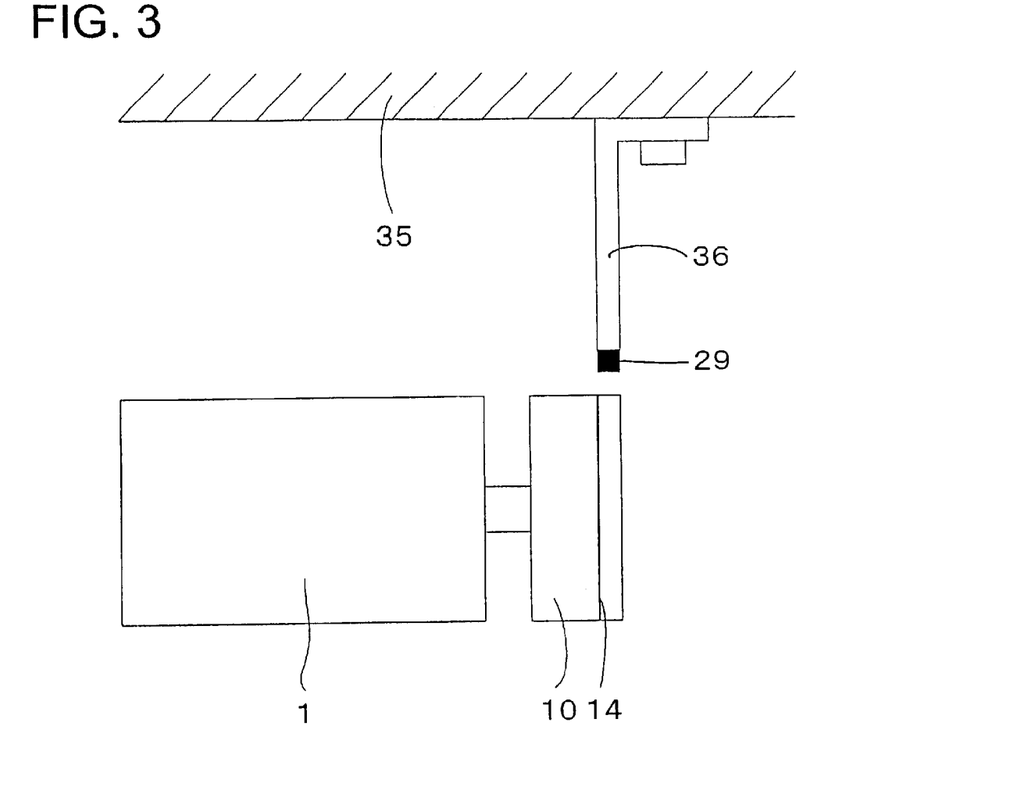
FIG. 3 is an explanatory drawing showing another embodiment of the present invention.
Figure 4:
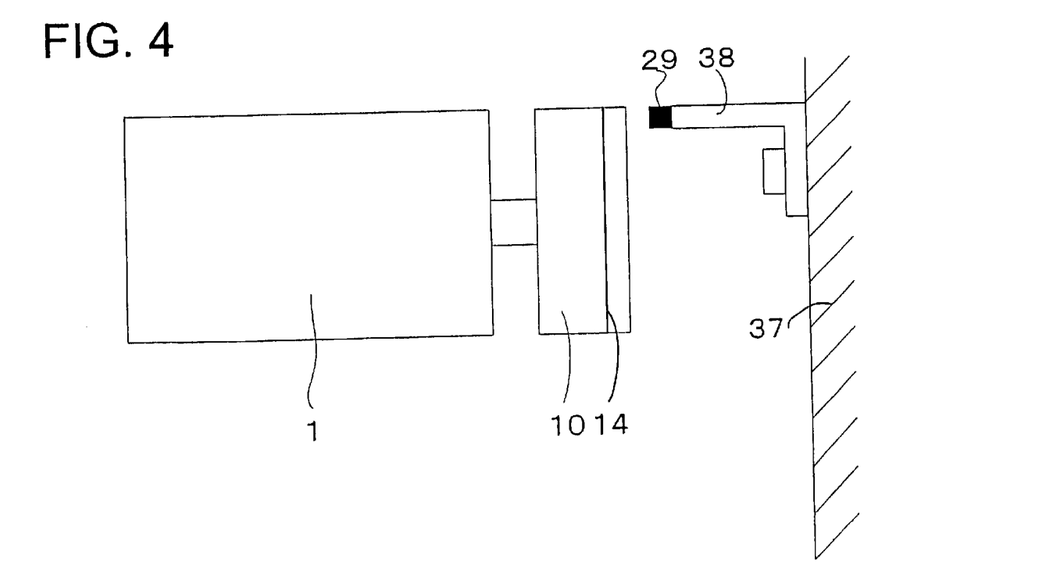
FIG. 4 is an explanatory drawing showing still another embodiment of the present invention.
Figure 5:
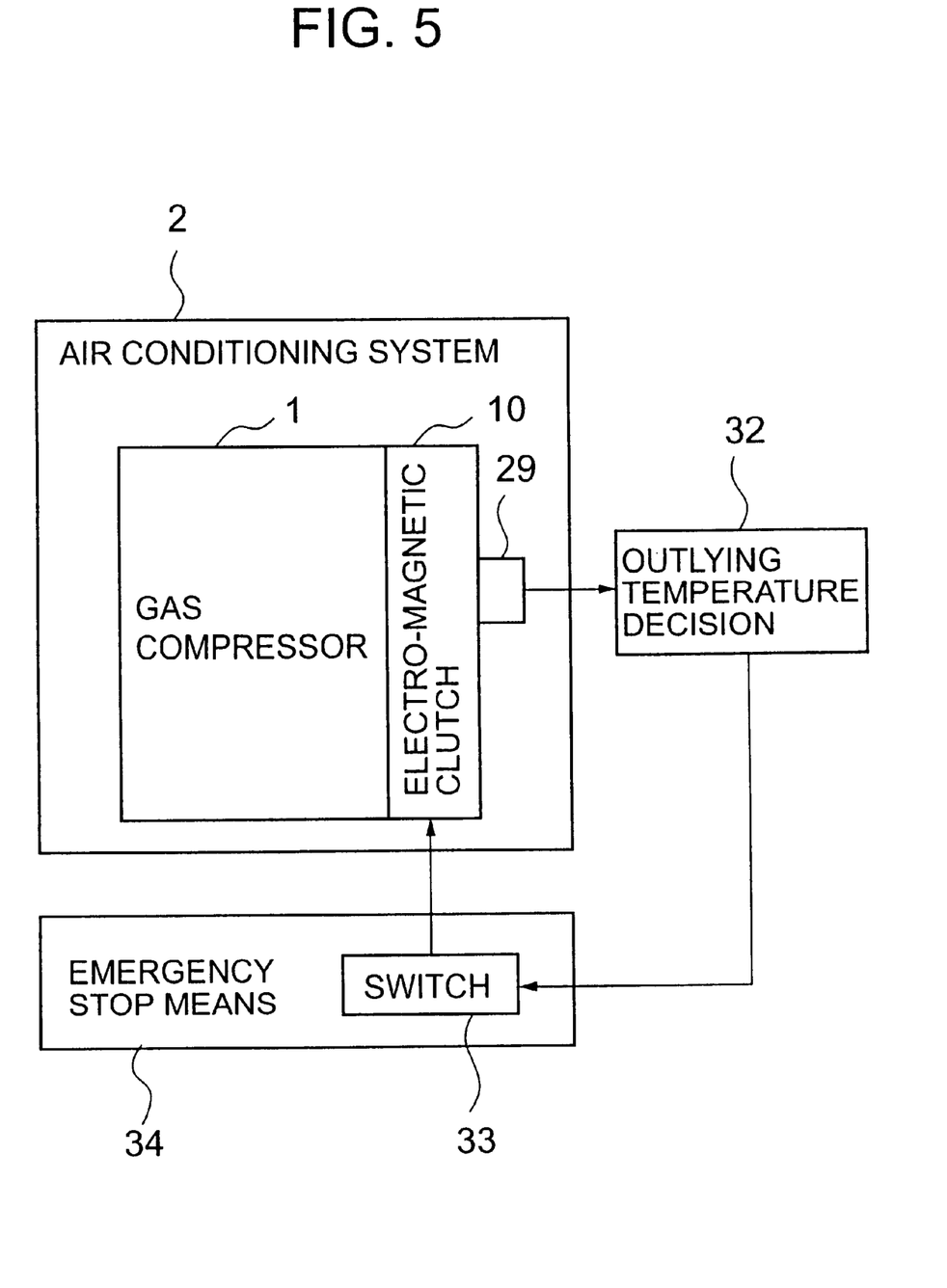
FIG. 5 is a block diagram showing a control system for coping with anomalous temperature in the air conditioning system of this invention.

FIG. 1 is a longitudinal sectional view of a gas compressor according to an embodiment of this invention; FIG. 2 is an enlarged partial view of FIG. 1; FIGS. 3 and 4 are explanatory diagrams showing other embodiments of this invention; and FIG. 5 is a block diagram showing a control system for coping with anomalous temperature in the air conditioning system of this invention having a gas compressor as shown in FIGS. 1, 3, 4, etc.

Regarding FIGS. 1 and 2, a detailed description of what has already been described with respect to the prior art will be omitted. The gas compressor 1 is of the type which is operated by transmitting external power to the compressor main body 25 through the electro-magnetic clutch 10. Further, the relationship between the air conditioning system 2 of FIG. 5 and the gas compressor 1 is well known in the art, so a detailed description thereof will be omitted here.

First, an embodiment of this invention will be described with reference to FIGS. 1 and 2. A screw hole 30 is provided in the core flange portion 13 fastened to the core 11, at a position near the core 11 of the electro-magnetic clutch 10, and a temperature sensor (which is a thermistor sensor in this embodiment) 29 is fastened to the core flange portion 13 so as to be externally detachable by passing a threaded screw 31 through an opening in the temperature sensor 29 and engaging the screw 31 with a threaded screw hole 30.

It is desirable for the temperature sensor 29 to be mounted at a position where it can be easily replaced whenever it is out of order. Apart from the position in the core flange portion 13 near the core 11, the temperature sensor 29 may be mounted to the case cover 23 which is nearby so that it can be easily attached and detached. It is also possible to mount the temperature sensor 29 directly to the core 11 so as to detect a temperature nearer to that of the core. Further, since, in many cases, anomalous temperature rise in the electro-magnetic clutch 10 is attributable to anomalous heat generation in the ball bearing (which is a ball bearing in this embodiment) 27, it is desirable to arrange the temperature sensor 29 near the ball bearing 27.

Next, the embodiment of this invention shown in FIG. 3 will be described. In this embodiment, the present invention is applied to an automotive air conditioner, in which anomalous heat generation due to clutch slippage is detected at an early stage by detecting the radiant heat from the armature friction plate.

In FIG. 3, numeral 35 indicates an engine body, to which a stay 36 having the temperature sensor 29 at its forward end is mounted. The temperature sensor 29 is situated in the vicinity of, or proximate, the outer periphery of the armature friction plate 14 of the electro-magnetic clutch 10. Numeral 1 indicates a gas compressor.

The temperature sensor 29 of FIG. 3 senses radiation heat generated as a result of slippage between the armature friction plate 14 and the pulley end surface 26d (See FIG. 2), thus checking the armature friction plate 14 for anomalous heat generation.

FIG. 4 shows still another embodiment of this invention. In this embodiment shown by FIG. 4 also, the present invention is applied to an automotive air conditioner as in FIG. 3. By detecting radiation heat from the armature friction plate, anomalous heat generation due to clutch slippage is detected at an early stage.

FIG. 4, numeral 37 indicates a chassis on which an engine, a gas compressor, etc. are mounted. Mounted to the chassis 37 is a stay 38 having the temperature sensor 29 at its forward end. The temperature sensor 29 is situated in the vicinity of, or proximate, the outer periphery of the end surface of the armature friction plate 14 of the electro-magnetic clutch 10. Numeral 1 indicates the gas compressor.

The temperature sensor 29 of FIG. 4 senses radiation heat generated as a result of slippage between the armature friction plate 14 and the pulley end surface 26d (See FIG. 2), thus checking the armature friction plate 14 for anomalous heat generation.

In the embodiments shown in FIGS. 1 through 4, the temperature detection output of the temperature sensor 29 is transmitted to an outlying temperature decision means 32 located remotely from the air conditioning system 2 as shown in FIG. 5. When it is determined by the outlying temperature decision means 32 that the temperature detection output (output signal) is an anomalous value, an anomaly decision output is transmitted to a switch 33 of the driving circuit of the electro-magnetic clutch 10 to interrupt the driving circuit of the electro-magnetic clutch attributable to an anomalous temperature rise in the electromagnetic clutch. When the gas compressor 1 is used in a GHP, the power of the entire air conditioning system 2 is turned off by an emergency stop means 34.

Figure 6:
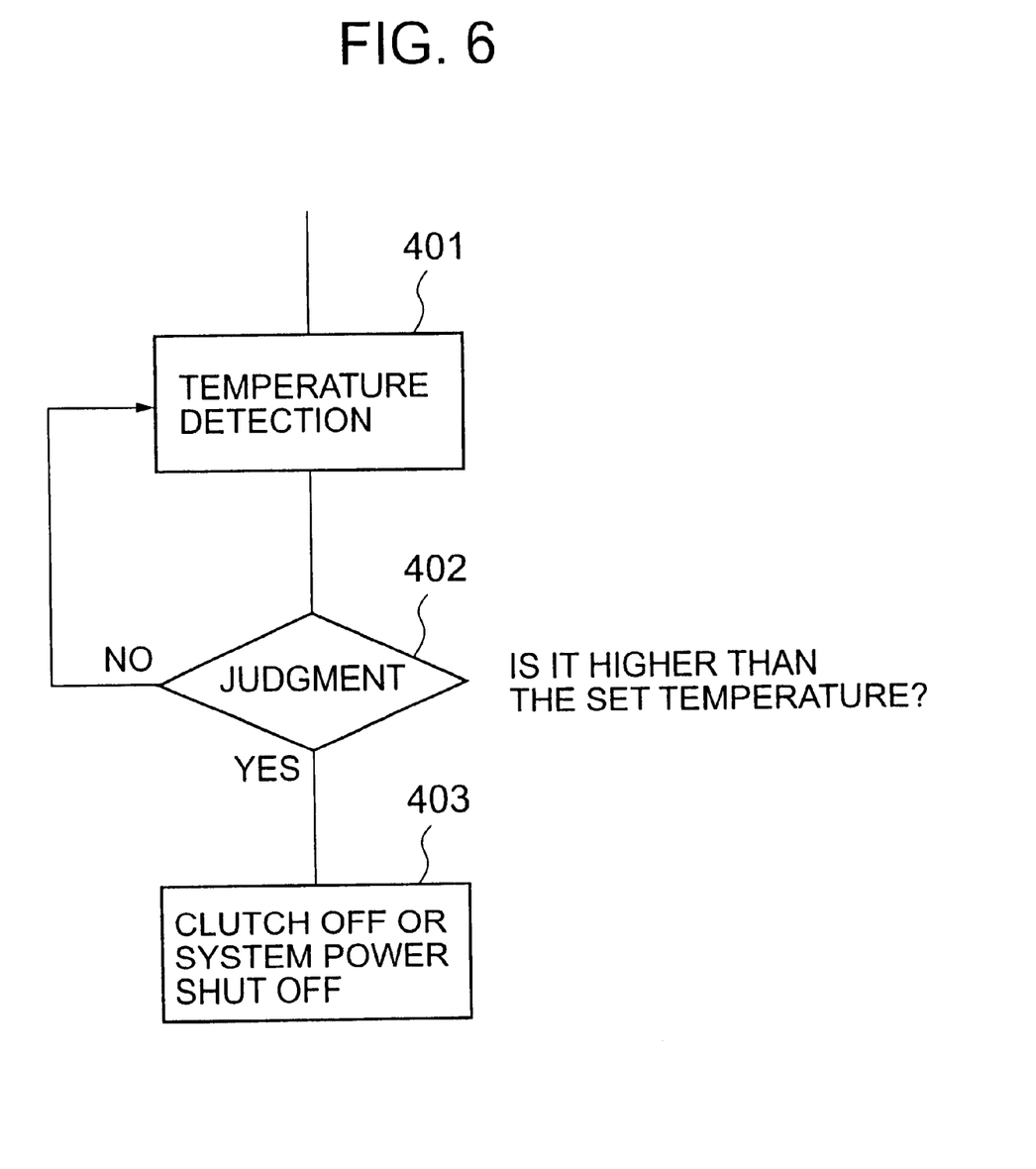
FIG. 6 is a flowchart illustrating a control operation for coping with anomalous temperature in the air conditioning system of this invention.

FIG. 6 is a flowchart showing a control operation flow to cope with anomalous temperature in the air conditioning system of this invention. In step 401, the temperature of the temperature sensor 29 is detected, and the temperature detection output signal is constantly supplied to the outlying temperature decision means 32. In step 402, the outlying temperature decision means 32 makes a judgment as to whether the temperature detection output signal of the temperature sensor 29 is in excess of a preset temperature of, for example, 90° C. When it is not in excess of the pre-set temperature (i.e., when the answer in this step is NO), the procedure returns to step 401, and when it is in excess of the pre-set temperature (i.e., when the answer in this step is YES), an anomaly decision output is transmitted to the switch 33, and the switch 33 is opened in step 403 to turn off the electro-magnetic clutch. Alternatively, the anomaly decision output is supplied to the emergency stop means 34 to operate the same to thereby turn off the power of the air conditioning system 2.

The above pre-set temperature serving as a reference for the outlying temperature decision means varies depending on the heat-generation object whose temperature is to be measured; the object may be the ball bearing, the armature friction plate, or the core. Thus, an appropriate reference temperature is set according to the heat-generation object. The reference temperature also depends on the mounting position of the temperature sensor 29, the core mold material, the distance between the temperature sensor and the heat-generation object, the dimensions, configuration, and structure of the electro-magnetic clutch, etc. Further, the difference between the core mold temperature and the temperature of the temperature sensor has also to be taken into account. In view of this, the pre-set reference temperature is determined by experiment.

Instead of the thermistor, it is also possible to use other types of temperature sensors suitable for temperature measurement in the temperature range around 100° C., such as a thermocouple and a resistance temperature sensor (thermistor). Further, when a thermal protector, a thermal fuse or the like is used as the temperature sensor, the temperature sensor also serves as the switch of the emergency stop means.

When the temperature sensor is mounted at a position where it is detachable, it is possible to replace the sensor whenever it is deteriorated. When the sensor is arranged in the periphery of the electro-magnetic clutch, it is possible to adopt a large sensor or an inexpensive, general purpose sensor, thus achieving a high degree of flexibility in the selection of the sensor and a reduction in the cost of checking the electro-magnetic clutch for anomalous heat generation.

As described above, in accordance with this invention, whenever the electro-magnetic clutch attains an abnormally high temperature, this is detected, and anomalous heat generation in the electro-magnetic clutch due to the high temperature is soon found out, so that it is possible to prevent damage to the electro-magnetic clutch, thereby achieving an improvement in terms of the reliability of the gas compressor and the air conditioning system.

What is claimed is:

1. A gas compressor comprising:
   an electro-magnetic clutch;
   a compressor main body to which torque is transmitted from an external power source through the electro-magnetic clutch; and
   a temperature sensor removably screw-fitted on an outer surface of the electro-magnetic clutch for detecting the temperature of the outer surface of the electro-magnetic clutch.

2. A gas compressor according to claim 1, wherein the temperature sensor is removably screw-fitted to a portion of the electro-magnetic clutch near a ball bearing of a driving-side pulley of the electro-magnetic clutch so as to be externally detachable.

3. A gas compressor according to claim 1, wherein the temperature sensor is removably screw-fitted to a core flange portion of the electro-magnetic clutch so as to be externally detachable.

4. A gas compressor comprising:
   an electro-magnetic clutch;
   a compressor main body to which torque is transmitted from an external power source through the electro-magnetic clutch; and
   a temperature sensor removably screw-fitted to a surface located in the proximity of an outer surface of the electro-magnetic clutch for detecting the temperature of a portion near the outer surface of the electro-magnetic clutch.

5. A gas compressor according to claim 4, wherein the temperature sensor is removably screw-fitted to an outer peripheral portion of an armature friction plate of the electro-magnetic clutch so as to be externally detachable.

6. A gas compressor according to claim 4, wherein the temperature sensor is removably screw-fitted to a front surface of an armature friction plate of the electro-magnetic clutch so as to be externally detachable.

7. An air conditioning system comprising:

an electro-magnetic clutch;

a compressor main body to which torque is transmitted from an external power source through the electro-magnetic clutch;

a temperature sensor removably screw-fitted on an outer surface of the electro-magnetic clutch for detecting the temperature of the outer surface of the electro-magnetic clutch;

outlying temperature decision means for determining whether a temperature detection output of the temperature sensor is an anomalous value; and emergency stop means for interrupting a driving circuit of the electro-magnetic clutch when the output of the outlying temperature decision means indicates an anomalous value.

8. An air conditioning system comprising:

an electro-magnetic clutch;

a compressor main body to which torque is transmitted from an external power source through the electro-magnetic clutch;

a temperature sensor removably screw-fitted to a surface in the proximity of an outer surface of the electro-magnetic clutch for detecting the temperature of a portion near the outer surface of the electro-magnetic clutch;

outlying temperature decision means for determining whether a temperature detection output of the temperature sensor is an anomalous value; and emergency stop means for interrupting a driving circuit of the electro-magnetic clutch when the output of the outlying temperature decision means indicates an anomalous value.

9. An air conditioning system according to any one of claims 7 and 8, wherein the emergency stop means stops operation of the air conditioning system when the output of the outlying temperature decision means indicates an anomalous value.

10. A gas compressor comprising:

a compressor main body having a rotor shaft;

an electro-magnetic clutch for transmitting rotary torque from an external source to the rotor shaft; and a temperature sensor detachably screw-fitted to an outer surface of the electro-magnetic clutch or to a surface in proximity to an outer surface of the electro-magnetic clutch for detecting the temperature in the immediate vicinity of the temperature sensor and providing a corresponding temperature detection output signal.

11. A gas compressor according to claim 10; wherein the screw-fitted comprises a threaded screw-fitted extending through an opening in the temperature sensor into the surface to which the temperature sensor is connected.

12. A gas compressor according to claim 11; wherein the temperature sensor is in direct contact with the surface to which the temperature sensor is connected.

13. A gas compressor according to claim 10; wherein the temperature sensor is detachably screw-fitted to an outer surface of the electro-magnetic clutch near a ball bearing of a driving-side pulley of the electro-magnetic clutch so that the temperature sensor can be externally detached and removed from the outer surface of the electro-magnetic clutch.

14. A gas compressor according to claim 10; wherein the temperature sensor is detachably screw-fitted to an outer surface of a core flange portion of the electro-magnetic clutch so that the temperature sensor can be externally detached and removed from the core flange portion.

15. A gas compressor according to claim 10; wherein the temperature sensor is detachably screw-fitted to an outer surface of an armature friction plate of the electro-magnetic clutch so that the temperature sensor can be externally detached and removed from the armature friction plate.

16. A gas compressor according to claim 15; wherein the temperature sensor is detachably screw-fitted to an outer front surface of the armature friction plate.

17. An air conditioning system comprising:

a gas compressor as claimed in claim 10;

temperature decision means connected to receive the temperature detection output signal for determining whether the temperature detection output signal is an anomalous value; and a switch for turning off the electro-magnetic clutch when the temperature decision means determines that the temperature detection output signal is an anomalous value.

18. An air conditioning system according to claim 17; including means for stopping operation of the air conditioning system when the temperature decision means determines that the temperature detection output signal is an anomalous value.

19. An air conditioning system according to claim 17; wherein the temperature decision means is located remotely from the gas compressor.

20. A gas compressor according to claim 10; wherein the temperature sensor comprises one of a thermistor, a thermocouple, a thermistor and a thermal fuse.

21. A gas compressor according to claim 10; wherein the temperature sensor is detachably screw-fitted to a forward end surface of a stay and is disposed proximate an outer surface of the electro-magnetic clutch.

22. A gas compressor according to claim 21; wherein the stay is connected to an engine body of a motor vehicle.

23. A gas compressor according to claim 21; wherein the stay is connected to a chassis of a motor vehicle.

* * * * *